Figure 14:
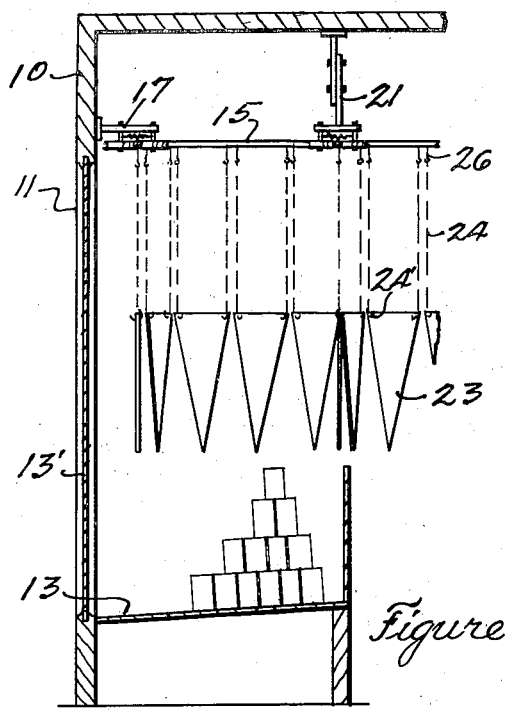

March 5, 1935.  E. R. GENTRY ET AL  1,993,545
ADVERTISING DISPLAY
Filed Nov. 26, 1932   3 Sheets-Sheet 1
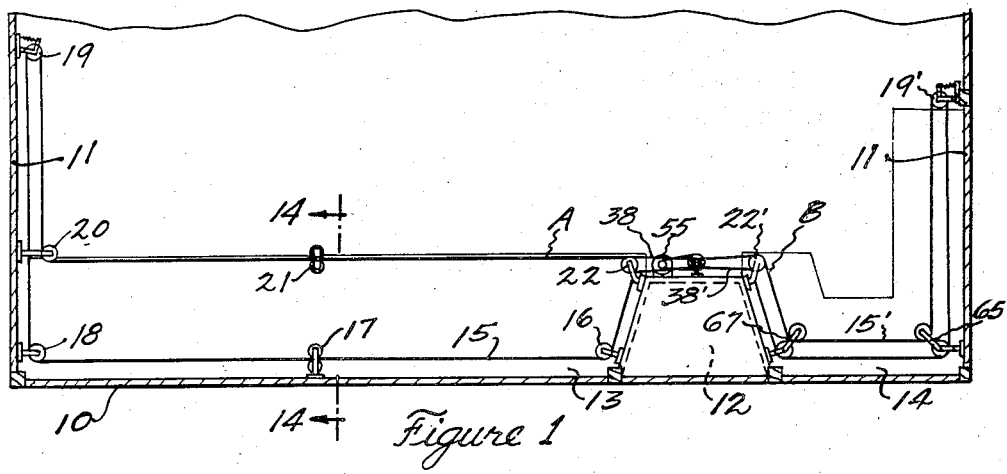
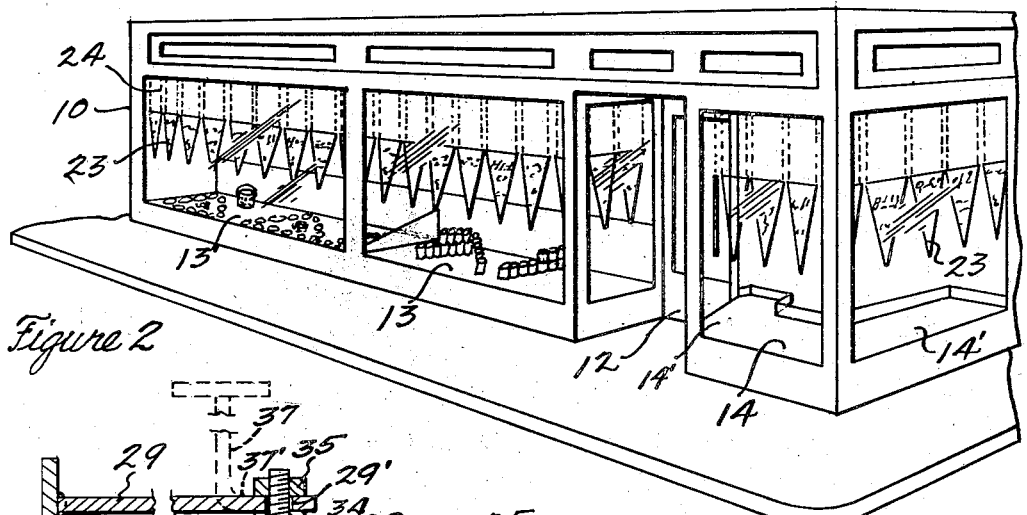
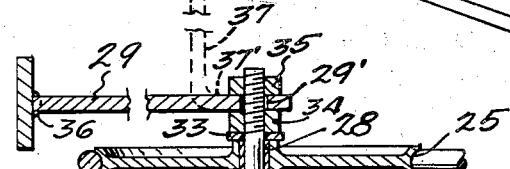
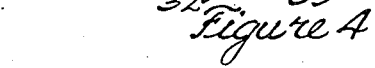
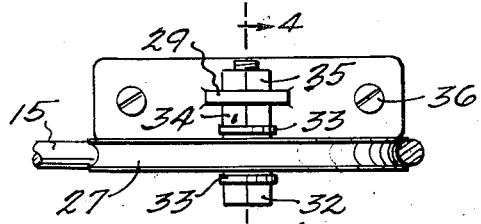
INVENTORS
Elias R. Gentry
BY Jim R. Moss
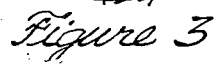
ATTORNEY.

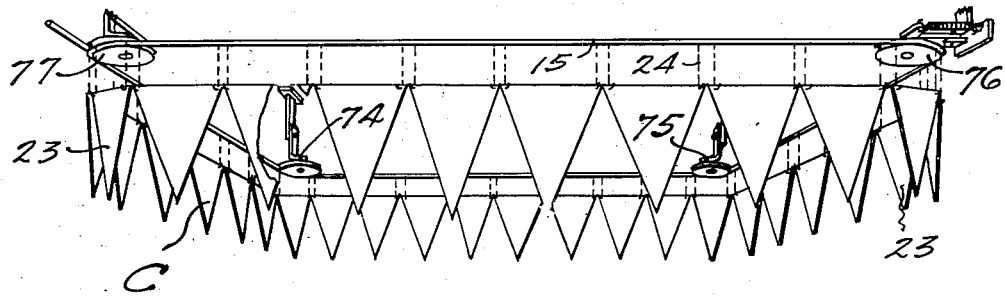
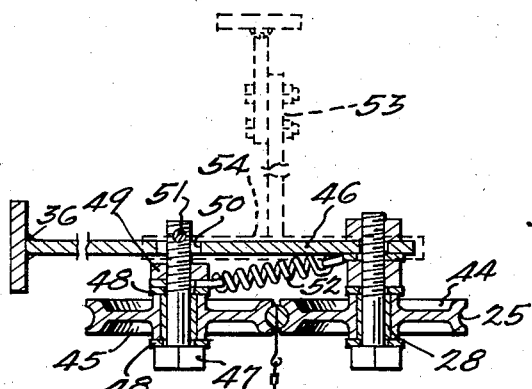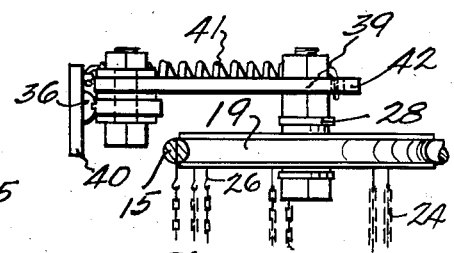
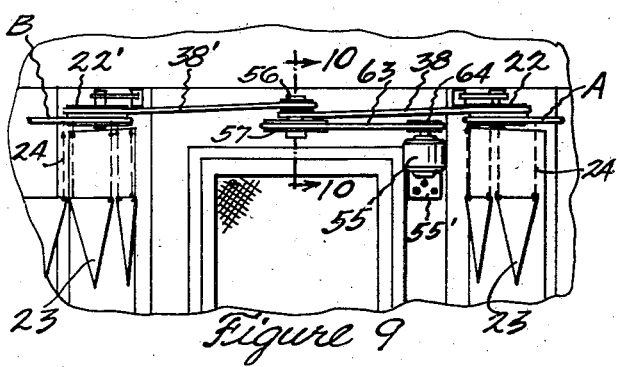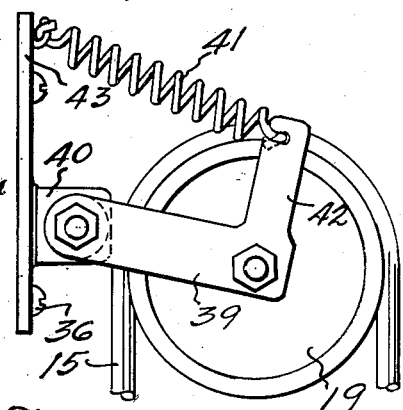
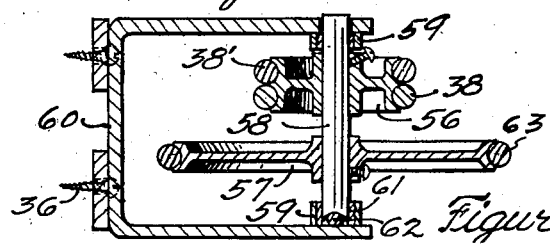

March 5, 1935.  E. R. GENTRY ET AL  1,993,545

ADVERTISING DISPLAY

Filed Nov. 26, 1932  3 Sheets-Sheet 3

INVENTORS
Elias R. Gentry
BY Jim R. Moss
ATTORNEY.

Patented Mar. 5, 1935

1,993,545

UNITED STATES PATENT OFFICE 1,993,545

ADVERTISING DISPLAY

Elias R. Gentry, Breckenbridge, and Jim R. Moss, Eastland, Tex.; said Moss assignor to said Gentry Application November 26, 1932, Serial No. 644,438

2 Claims. (Cl. 40—32)

This invention relates to new and useful improvements in advertising displays.

One object of the invention is to provide a display device embodying the movable mounting of a plurality of advertising displays for circuitous travel, whereby said displays are continuously exhibited over a wide area.

Another object of the invention is to provide a movable mounting for a plurality of displays which mounting is adaptable to display areas of various limitations or irregularities for travel of said displays in circuitous paths conforming to such display areas.

A further object of the invention is to provide means for movably supporting a plurality of displays in open view for travel in a circuitous path, whereby said displays are exhibited in series or sequence relation to any fixed point of view throughout their path of travel.

Another object of the invention is to provide means for movably supporting a flexible conveyor for travel in a circuitous path together with means for mounting displays on said conveyor for movement therewith whereby said conveyor may be engaged on its diametrically opposite sides by the movable supporting means for support thereby.

A still further object of the invention is to provide means for movably supporting a plurality of displays and which means is adaptable either in a single unit for travel of said displays in a single circuitous path or in a plurality of connected units having a common drive for travel of said displays in a plurality of circuitous paths, conforming to the display area.

Still another object of the invention is to provide means for movably supporting a plurality of displays for travel in a circuitous path, whereby all sides of said displays are exhibited during their travel to a fixed point of view.

A further object of the invention is to provide means for movably supporting a plurality of interchangeable displays as hereinbefore described, which supporting means is formed of durable parts of simple and efficient construction and easy and convenient assembly and mounting, thus making for efficiency in installation as well as operation.

A construction designed to carry out the invention will be hereinafter described together with other features of the invention.

Figure 12:
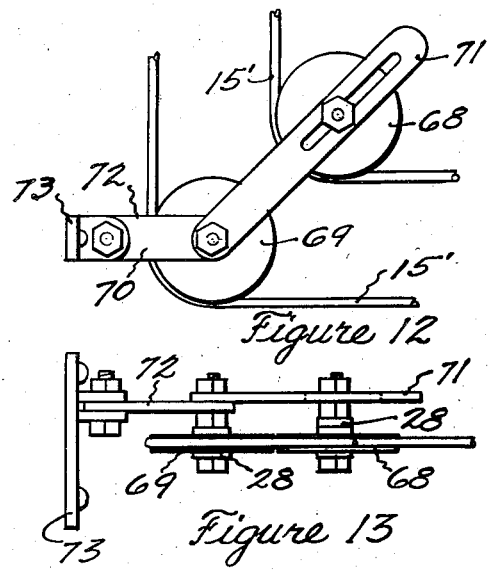
Figure 13:
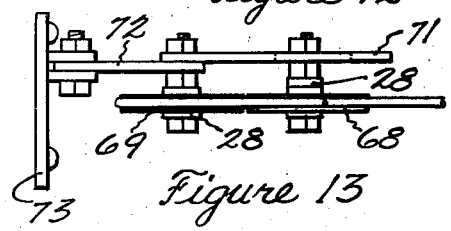
Figure 16:
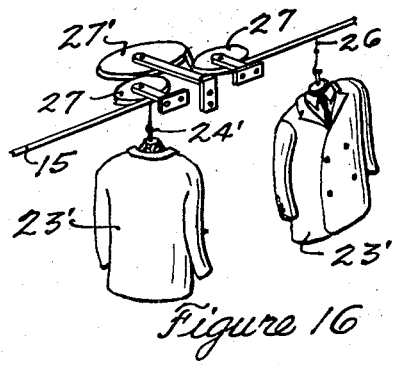
Figure 15:
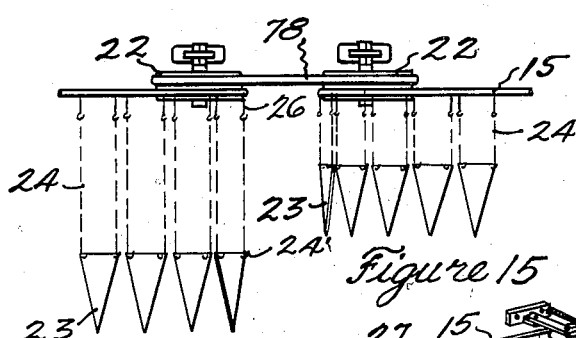
Figure 17:
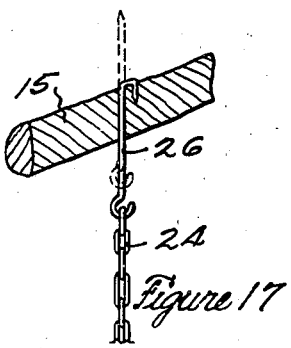
Figure 18:
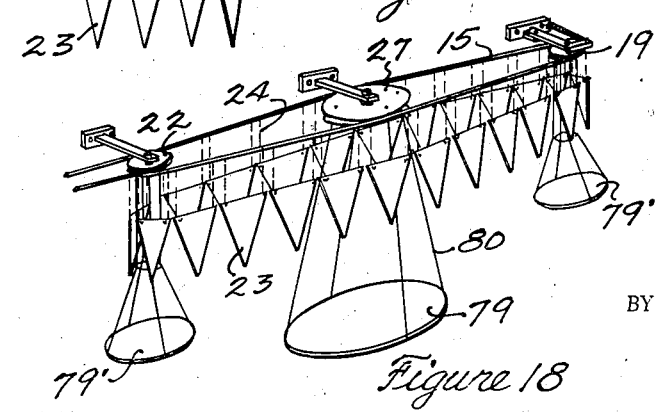

The invention will be more readily understood from a reading of the following specification and by reference to the accompanying drawings in which an example of the invention is shown, and wherein:

Figure 1 is a plan view showing a pair of display units constructed in accordance with the invention adapted to the display windows of a store, Figure 2 is a perspective view showing the display units as viewed externally of the store, Figures 3 and 4 are detailed views showing the suspended mounting of one of the single groove pulleys, Figure 5 is a view partly in section and partly in elevation showing the similar suspended mounting of one of the double grooved drive pulleys, Figures 6 and 7 are detailed views showing the spring tensioned mounting of one of the pulleys, Figure 8 is a vertical sectional view of an auxiliary spring tensioned conveyor supporting unit, Figure 9 is a partial elevation showing a common drive intermediate two display units, Figure 10 is a vertical sectional view through the common drive, taken on line 10—10 of Figure 9, Figure 11 is a perspective view showing a display unit mounted for exhibition of all sides of the displays carried by said unit to any fixed point of view, Figures 12 and 13 are detailed views showing the adjustable mounting of a pair of pulleys with relation to each other, Figure 14 is a vertical sectional view taken on line 14—14 of Figure 1, Figure 15 is an elevational view showing the common drive intermediate a pair of the display units, Figure 16 is a perspective view showing a mounting of the conveyor belt for effecting a partial revolution of the displays during their travel for exhibition of all sides of said displays, Figure 17 is an enlarged sectional view of a portion of the conveyor belt showing one means of suspending the displays therefrom, and Figure 18 is a perspective view showing a connected drive intermediate the display unit and an auxiliary rotating display.

In the drawings the numeral 10 designates a building or store having side walls 11, an entrance 12, and show windows 13 and 14 on opposite sides of said entrance. As best shown in Figures 1, 2 and 14, these windows are recessed and of several feet in depth, and are adapted for the display of merchandise therein. The windows 13 are of the type intended solely for display purposes with the merchandise contained therein being inaccessible to the trade or customers within the store, while the windows 14 are of the type intended for the display of merchandise to which the trade has access for selection.

It is to be understood that the construction of the building and adaption of its show windows does not form a part of the invention other than as used in combination therewith to illustrate the invention and its utility.

Within the store and encircling the show windows 13, I have mounted an endless belt conveyor or carrier 15 upon pivotally suspended pulleys 16, 17, 18, 19, 20, 21, and 22, with the pulley 19 positioned to provide for extended travel of the conveyor alongside the wall at one end of said windows. By mounting the pulleys so that the conveyor will encircle the display area of the windows, displays 23 which are mounted on said conveyor for travel therewith will be presented in close and prominent relation to both the trade within the store and the traffic within the street.

It is preferable to mount the conveyor and its supporting pulleys above the glass or transparent portions 13' of said windows so that only the displays and the chains 24 or the like, by which they are suspended from the conveyor, will be visible to normal view from the street, as shown in Figures 2 and 14.

It is also preferable that the displays be positioned at an approximate average eye level, wherever convenient, to provide for maximum attraction and exhibition. The elevation of the displays may, of course, be varied according to the length of the supporting chains 24. It is obvious that these moving displays will not conflict with the usual exhibition of merchandise within the windows and when desired may be used in conjunction therewith.

The belt conveyor 15 may be of any material or shape suitable for the purpose, but we have found it desirable to use a belt of round shape in cross section and of braided composition material in conjunction with pulleys having peripheral concaved grooves 25 for receiving said belt, whereby said pulleys may be adapted to either of the diametrically opposite sides of said belt for supporting the same, as shown in Figures 8 and 16. The size of the belt with relation to the size of the concaved grooves 25 is such that less than one-half of the belt is received within the grooves, thereby enabling a hanger pin 26 or the like, Figure 17, by which the supporting chains are attached to the belt, to be mounted in the center of the belt free of engagement with the pulleys. With this type of mounting of the displays and of the conveyor, said conveyor may be adapted for travel in paths of various configurations.

The pulleys 16, 18, and 20 and their mountings are similar and, as shown in Figures 4 and 5, each comprise a single pulley 27 having a concave peripheral groove 25, as hereinbefore explained, which pulley has a suspended rotatable mounting 28 from the outer end of a suitable wall bracket 29. This rotatable mounting consists of a greaseless or graphite bushing 30 provided internally of the hub 31 of the pulley, which is rotatably mounted on a headed shaft 32 intermediate loose washers 33. The upper end of the shaft extends through an opening 29' in the outer end of the bracket and has nuts 34 and 35 screw-threaded thereon for rigidly securing said shaft to said bracket. The bracket may be mounted on the wall in any suitable manner, such as by screws 36. This bracket may be made in various lengths or adjustable in length, as desired. Should it be more desirable to suspend the pulley from the ceiling, a bracket 37, similar to the bracket 29, and having its outer or lower end bent at right angles to form a foot 37' to which the shaft is secured, may be provided.

It is herein noted that similar parts having similar functions will be referred to by similar reference numerals.

The pulley 22, as shown in Figure 5, is a double pulley having a pair of peripherical grooves, a lower groove 25 and an upper groove 25'. This pulley has a suspended rotatable mounting 28 from the outer end of a wall bracket 29, as hereinbefore described, and serves as a drive pulley for the conveyor belt, which is mounted in the lower groove 25. A drive belt 38 is mounted intermediate the upper groove 25' of said pulley and a suitable drive, as will be hereinafter described.

For maintaining the belt conveyor under constant spring tension, irrespective of contraction or expansion of said belt, to prevent its displacement from the pulleys, we have provided the pulley 19 with a suspended rotatable mounting 28 from the outer end of the pivoted bracket arm 39 of a wall bracket 40. The conveyor belt is mounted on the pulley with the same swung in a clockwise direction, Figures 1 and 7, under tension of a coiled spring 41 which is mounted intermediate an integral finger 42, extending at right angles from the outer end of the arm 39, and an extended end 43 of the wall bracket. Such a spring tensioned pulley may be adapted to the conveyor at any suitable position, such as where there is an appreciable change in the direction of travel of the belt conveyor.

The pulleys 17 and 21, which are dual pulleys and similar to each other, are provided as auxiliary supports for the belt conveyor where there is no change in the direction of travel of said conveyor. Each of these pulleys, as shown in Figure 8, comprises a pair of single groove pulleys 44 and 45 mounted with their peripheral grooves 25 in opposite relationship for receiving the belt conveyor therebetween. The pulley 44 has a suspended rotatable mounting 28 from the outer end of a wall bracket 46, while the other pulley 45 is rotatably mounted on a headed shaft 47 intermediate loose washers 48 which are confined on said shaft by a screw-threaded nut 49. The upper end of the shaft extends through an opening 50 in the bracket and is pivotally suspended from a fixed pin 51 on the upper side of said bracket whereby a coiled spring 52 mounted under tension intermediate said pulleys will tend to swing the pulley 45 towards the pulley 44 and thereby hold the belt mounted therebetween from displacement of their grooves.

As less than one-half of the belt is received by each of the pulleys, as hereinbefore explained, the hanger pins 26 mounted in said belt will travel freely between the pulleys 44 and 45. Where it is more desirable to suspend these auxiliary supports from the ceiling, a bracket 53 having a cross-arm 54 at its lower end and at right angles thereto and from which arm the pulleys are suspended, may be provided, as shown in dotted lines.

As best shown in Figures 9 and 10 we have provided a reduced drive connection intermediate the drive pulley 22 and an electric motor 55, whereby the belt conveyor is moved slowly in its circuitous travel. The speed of the belt may, of course, be varied as desired. This reduced drive comprises the mounting of a double groove pulley 56 of small diameter and a single groove pulley 57 of larger diameter on a shaft 58 which is journaled in bearings 59 of a bracket 60. The bearings are provided with internal greaseless bushings 61. The shaft is supported on a ball bearing 62 confined within the lower bushing of the bracket to provide for minimum frictional bearing. The drive belt 38 of the pulley 22 is mounted intermediate said pulley and the pulley 56, while a belt 63 is mounted intermediate the pulley 57 and a pulley 64 of small diameter, which is mounted on the drive shaft of the motor. The motor may be mounted in any suitable position such as on a wall bracket 55', as shown. The relative sizes of the pulleys 56, 57 and 64 may be varied according to the speed of drive desired.

The motor and driving connection are shown as positioned intermediate the drive pulley 22 of the belt conveyor and its supporting pulleys hereinbefore described and hereinafter referred to as unit A and the drive pulley 22' of a unit B, whereby a drive belt 38' may be conveniently mounted between the pulley 22' and the other groove of the pulley 56. A common drive is thus provided for the units A and B, Figure 9.

As best shown in Figures 1 and 2, the unit B is adapted to the show windows 14 on the opposite side of the entrance 12 from the unit A. This unit B comprises an endless belt 15' mounted upon pivotally suspended pulleys 19', 65, 67 and the drive pulley 22', with said pulleys adapted for circuitous travel of said belt in close relationship to the glass or transparent portions 14' of said windows, whereby the displays 23 mounted on the belt conveyor will not conflict with the access of the trade to merchandise contained in the windows.

The belt 15' is similar to the belt 15 and the pulleys 19' and 22' and their mountings are similar, respectively, to the pulleys 19 and 22 and their mountings, while the pulleys 65 and 67 are each dual pulleys and are similar to each other. Each of these pulleys comprises a pair of single groove pulleys 68 and 69 adjustably mounted with relation to each other and having rotatable suspended mountings 28 from an adjustable bracket 70. As shown, in Figures 12 and 13, the pulleys 68 is adjustable longitudinally of the outer end of an arm 71, the other end of which is pivotally secured to the outer end of a pivotally adjustable bracket arm 72 of a wall bracket 73. The pulley 69 is positioned at the pivotal connection of the arm 71 and the bracket arm 72. With this mounting the pulleys may be positioned to maintain closely related paths of the displays in parallel relationship, irrespective of the angular change in the direction of travel of said displays.

In Figure 11 we have illustrated a unit C mounted in an open display area for the unrestricted exhibition of the displays carried thereby throughout their circuitous travel. The belt conveyor is mounted on pulleys 74, 75, 76 and 77 which are supported by ceiling brackets. The pulleys 74 and 75 are single groove pulleys similar to the pulley 16, while the pulley 76 is a spring tensioned pulley similar to the pulley 19, and the pulley 77 is a double grooved drive pulley similar to the pulley 22 and with which a suitable drive connection may be had, as hereinbefore explained. The displays are suspended from the conveyor by shortened chains to provide for overhead travel of said displays. The spacing of the supporting pulleys to provide for open travel of the conveyor with respect to its diametrically opposite sides permits the displays to be viewed from practically any point either within or without the area encircled by the path of the displays.

Where there is a plurality of display units the same may be connected in series for operation by a single drive. This series connection may be effected, as shown in Figure 15, by mounting a connecting belt 78 intermediate oppositely mounted double groove drive pulleys 22 of each unit for transmitting motion from one unit to the other.

As illustrated in Figure 16, an alternating partial revolution of the displays may be effected for exhibition of all sides of said displays to a fixed point of view by causing the belt conveyor to travel in a sinuous path embodying alternating changes in the direction of travel. A pair of the pulleys 27 are mounted in close spaced relation with a third pulley 27', of larger size in diameter, mounted in staggered relation with the pulleys 27. The belt is positioned on the pulleys so as to pass partially around each of them whereby the displays 23' carried by said belt will revolve in first one direction and then the other to present all sides of the displays for exhibition, to a predetermined point of view. Obviously, various other paths of travel of the displays may be had with varying arrangements and adaptions of the pulleys and conveyor.

We have further illustrated in Figure 18 a belt conveyor mounted between a drive pulley 22 and a pulley 19, with an intermediate pulley 27, of larger size in diameter, adapted to the belt for rotation thereby. A circular disk 79, upon which display elements may be mounted, if desired, is suspended from the intermediate pulley 27 by apparently invisible wires 80. The effect produced is that of an unsupported disk rotating in mid-air. Likewise, similar disks 79' may be suspended from the pulleys 22 and 19 to enlarge upon the display.

It is to be remembered that the invention is not to be limited to the display pennants or placards 23 shown in Figures 2, 9, 11, 14 and 15 as various other types and forms of display elements such as miniature articles or actual merchandise, as the clothing models 23' shown in Figure 16, and the like may be used with desirable results. The displays are mounted on hooks 24' at the bottom of the chains to make for ready and convenient change of said displays.

It is pointed out that the weight of the suspended displays will prevent normal twisting of the belt and hold the same in position with the hangers 26 normally disengaged from the pulleys. And any excessive tendency of the belt to twist will only cause the hangers to engage the periphery of the pulley which they are adjacent and thereby prevent the supporting chains from being wound upon the belt.

It is further pointed out that the displays may be mounted in sequence relation to form a composite display or series of related displays. The invention is not to be limited to the various illustrations shown and described herein as the same have been used merely to illustrate the flexibility and adaptability of the invention to various uses under various conditions.

Furthermore, the simple and rugged construction of the various parts of the invention together with the convenience and ease of adaption and mounting of said parts in various types of units, makes for efficiency in manufacture and operation as well as utility in use.

Various changes in the size and shape of the different parts, as well as modifications and alterations may be made within the scope of the appended claims.

What we claim is:

1. In an advertising display, a plurality of pivotally suspended pulleys having annular peripherial grooves, a flexible endless belt mounted on the pulleys and within the grooves for travel between said pulleys, a plurality of advertising displays, and means for suspending said displays from the belt at its bottom center, said belt being adapted to the peripheral grooves whereby the display suspension means are normally free from engagement with said pulleys.

2. In an advertising display, a plurality of pivotally suspended pulleys having annular concave grooves in their peripheries, an endless belt of round shape in cross section mounted within the grooves of said pulleys for travel therebetween, and a plurality of displays carried by said belt, the belt being adapted with relation to the grooves of the pulleys for normal disengagement of the display mounting means from the pulleys, the displays being suspended from the belt at its bottom center whereby said belt is engageable on its diametrically opposite sides by the pulleys.

ELIAS R. GENTRY.
JIM R. MOSS.